INVENTORS.
Richard A. Dean
Earl A. McCabe, Jr.

ATTORNEY.

United States Patent Office 3,432,390
Patented Mar. 11, 1969

3,432,390
FUEL ASSEMBLY FOR A NUCLEAR REACTOR
Richard A. Dean, Monroeville, and Earl A. McCabe, Jr., Pittsburgh, Pa., assignors, by mesne assignments, to the United States of America as represented by the United States Atomic Energy Commission
Filed July 28, 1967, Ser. No. 656,955
U.S. Cl. 176—78
Int. Cl. G21c 3/32
1 Claim

ABSTRACT OF THE DISCLOSURE

A flow alteration means to substantially eliminate coolant flow redistribution between adjacent fuel assemblies and to mix the exiting coolant while effecting a low coolant pressure drop. A fixed flow impeding device upon which the coolant impinges is placed above the fuel element cluster before the upper core plate.

BACKGROUND OF THE INVENTION

The invention described herein was made in the course of, or under, a contract with the U.S. Atomic Energy Commission.

Some fuel assemblies for pressurized water reactors contain control rods, hereinafter referred to as "rodded fuel assemblies," while other assemblies do not. Those assemblies containing no control rods will hereinafter be referred to as "unrodded fuel assemblies." Rodded fuel assemblies have an increased hydraulic resistance near the upper core plate due to control rod support and guide assemblies above and within fuel element cluster. An example of this type fuel assembly exists in the reactor at the San Onofre Nuclear Generating Station near San Clemente, Calif. This hydraulic resistance causes a flow redistribution to occur by redirecting coolant into other adjacent fuel assemblies. The net result of this flow redistribution is a decrease in mass flow rate and an increase in the enthalpy gain in those assemblies from which the flow is redirected Both these factors have an adverse effect on the available core power of the reactor.

SUMMARY OF THE INVENTION

This invention comprises attaching a stationary bladed flow alteration means at the exit end of the unrodded fuel assemblies thereby creating a hydraulic resistance to balance the coolant outlet flow between rodded and unrodded assemblies. Also, the bladed flow alteration means will blend the exiting flow so an average outlet coolant temperature can be measured, thus considerably reducing any error in interpreting data received from the in-core instrumentation. The bladed flow alteration means causes coolant balancing and good mixing while effecting only a low pressure drop in the coolant.

Accordingly, it is an object of this invention to increase the hydraulic resistance of an unrodded fuel assembly to balance the resistance of a rodded fuel assembly.

Another object of this invention is to provide a means for mixing the coolant exiting from the unrodded fuel assembly.

Still another object of this invention is to provide a means for mixing the coolant exiting from the unrodded fuel assembly so as to assist in determining an average outlet coolant temperature. Yet another object of this invention is to provide means for properly mixing the coolant exiting from the unrodded fuel assemblies while effecting a low pressure drop in the coolant.

BRIEF DESCRIPTION OF THE DRAWINGS

A preferred embodiment of the invention has been chosen for the purposes of illustration and description wherein.

The preferred embodiment illustrated is not intended to be exhaustive or to limit the invention to the precise form disclosed. It is chosen and described in order to best explain the principles of the invention and the application and practical use to thereby enable others skilled in the art to best utilize the invention in various embodiments and modifications as are best adapted to the particular use contemplated.

DESCRIPTION OF THE PREFERRED EMBODIMENT

Figure 1:
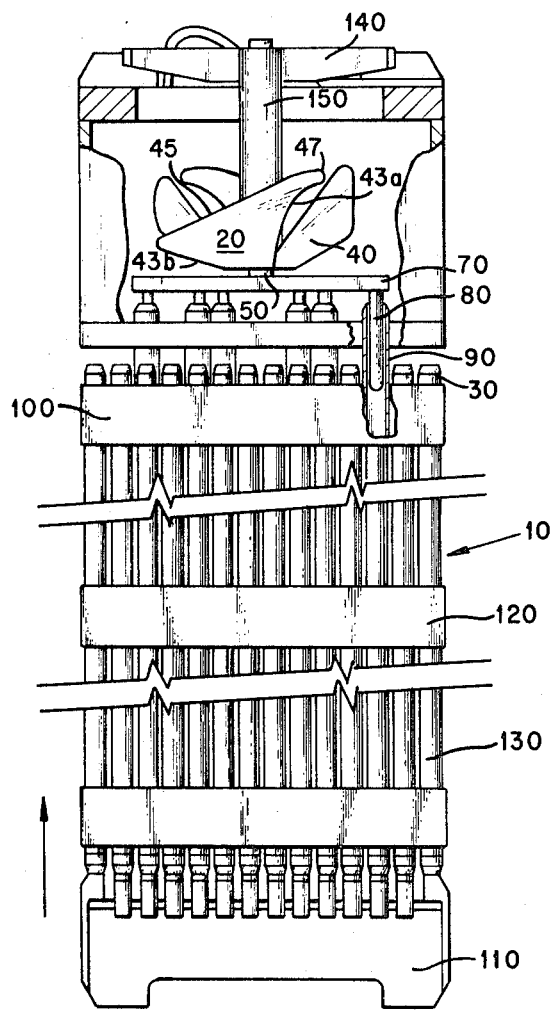
FIGURE 1 is a partially sectioned elevational view of a fuel assembly which embodies the invention.
Figure 2:
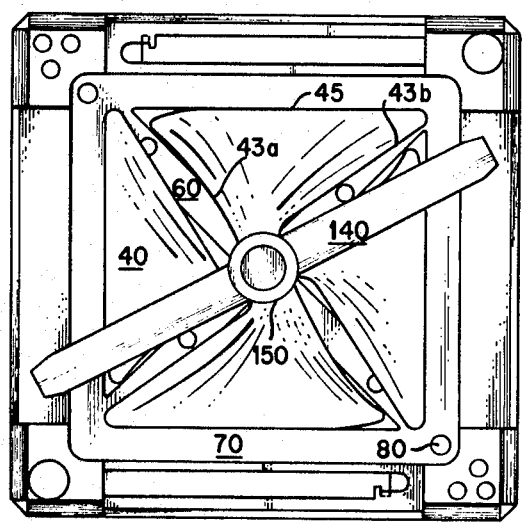
FIGURE 2 is an enlarged plane view of FIGURE 1.
Figure 3:
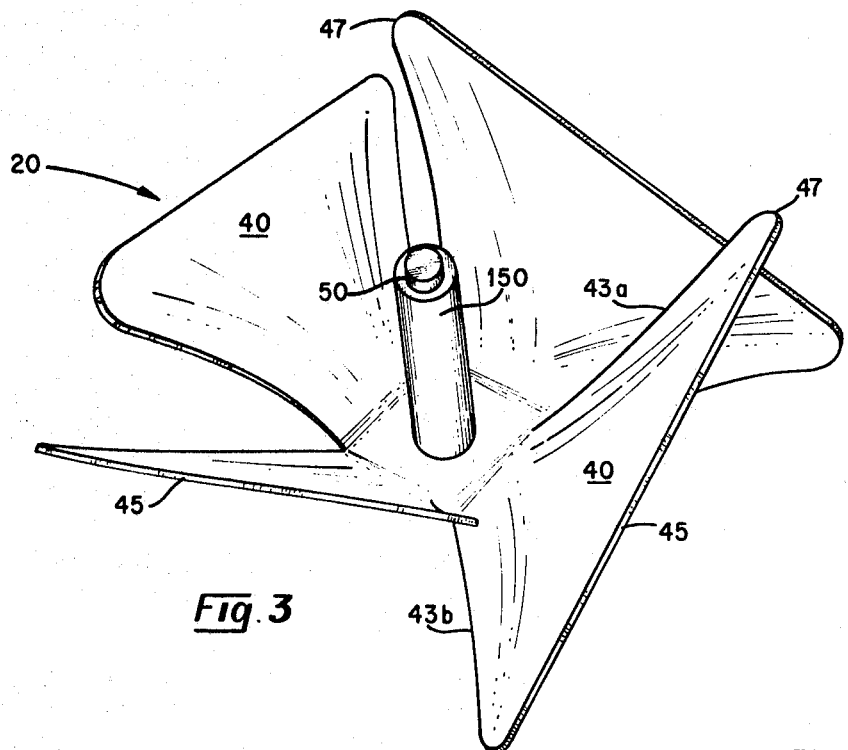
FIGURE 3 is a perspective view of the fixed flow impeding device.

Unlike the rodded fuel assembly, no control rod support and guide apparatus exists above and within the unrodded fuel assembly 10. To provide a hydraulic resistance and coolant flow mixer, a flow alteration means 20 is mounted between the upper core plate (not shown) and the top of the fuel elements 30 within the assembly. The preferred embodiment of this invention comprises a stationary bladed device 20 which provides good coolant mixing qualities and a controlled hydraulic resistance. Four radially spaced blades 40 symmetrically located are mounted upon a hub 50. Each blade is three-sided, having two side edges 43a, 43b and a tip edge 45. Each blade is slightly concaved and angled from its hub 50 in the direction of coolant flow. The direction of coolant flow through the fuel assembly 10 is indicated by the flow arrow in FIGURE 1. In the preferred embodiment each blade 40 is angled about 50° with respect to the horizontal top of the fuel elements 30. This angle can vary depending upon the fuel element and flow characteristics of the reactor system. The tip edge 45 is also disposed in the direction of coolant flow, rounded at its advanced end 47 where it joins a side edge 43a. This side edge 43a is of a bowed contour along its length. The blades, hub, and supporting apparatus, which will be described later, may be constructed of stainless steel.

The stationary bladed device 20 may be attached to the unrodded fuel assembly in any manner well known in the art. In the preferred embodiment, the hub 50 is attached at its base to cross-supports 60 within a frame 70. Depending from the frame are plugs 80 slidably housed in thimbles 90 which have replaced specific fuel elements within the fuel element cluster. The thimbles 90 are secured to an upper end plate 100, extend through the assembly and connect into a lower end nozzle 110. The upper end plate 100 is of an open grid construction to allow for the free passage of coolant through the assembly. Grids 120, selectively spaced, further support the fuel element assembly. Coolant channels 150 exist between the individual fuel elements. Axial movement of the stationary bladed device 20 due to hydraulic forces created by the impinging coolant is restricted by a cross-bar arrangement 140 which abuts the lower face of the upper core plate (not shown). This cross-bar arrangement 140 is attached to the stationary bladed device 20 by an axially extending post 150 connected to the hub 50. Coolant enters the lower end nozzle, proceeds up through the fuel element cluster via the coolant channels between elements, passing through the upper end plate and blade support frame striking the stationary bladed device where it is impeded and mixed. The coolant then proceeds out of the assembly.

It has been found that the flow alteration device of this invention provides an increased hydraulic resistance with a pressure drop less than 1 p.s.i. which substantially reduces coolant flow redistribution between fuel element assemblies while mixing the exiting coolant so that thermocouple readings provide an average or representative outlet coolant temperature.

It will be understood that the invention is not to be limited to the details herein given but it may be modified within the scope of the appended claim.

We claim:

1. In a nuclear reactor, an unrodded fuel assembly having at least one fuel element, a coolant exit end, separate channels for coolant flow disposed within said fuel assembly and fuel element support structure wherein the improvement is a flow alteration means for thermally equalizing the coolant while effecting a low pressure drop comprising a plurality of symmetrically disposed blades having two side edges and a tip edge, each of said blades further disposed at an angle of about 50° from a plane normal to the direction of coolant flow, the tip edge of each said blade being angled in the direction of coolant flow with its advanced end being rounded into a junction with a side edge, said side edge being of bowed contour along its length.

References Cited

UNITED STATES PATENTS

| | | | |
|---|---|---|---|
| 3,110,655 | 11/1963 | Martin | 176—43 |
| 3,127,320 | 3/1964 | Hainzelin et al | 176—43 X |
| 3,172,819 | 3/1965 | Picton | 176—43 X |
| 3,235,463 | 2/1966 | Sankovich | 176—78 X |
| 3,239,424 | 3/1966 | Lawson | 176—43 |
| 3,350,277 | 10/1967 | Costes | 176—87 |

CARL D. QUARFORTH, *Primary Examiner.*

M. J. SCOLNICK, *Assistant Examiner.*

U.S. Cl. X.R.

176—43, 66, 87